(12) United States Patent
Livingston

(10) Patent No.: US 7,828,428 B1
(45) Date of Patent: Nov. 9, 2010

(54) EYEGLASSES

(76) Inventor: Peter G. Livingston, 1103 Wild Citrus La., Sarasota, FL (US) 34240

( * ) Notice: Subject to any disclaimer, the term of this patent is extended or adjusted under 35 U.S.C. 154(b) by 0 days.

(21) Appl. No.: 12/489,255

(22) Filed: Jun. 22, 2009

(51) Int. Cl.
  *G02C 9/02* (2006.01)
(52) U.S. Cl. .......................................... 351/61; 351/159
(58) Field of Classification Search ............... 351/53, 351/54, 51, 52, 59, 60, 41, 159, 61; D16/318, D16/102
  See application file for complete search history.

(56) References Cited

U.S. PATENT DOCUMENTS

| | | | |
|---|---|---|---|
| 956,690 | A * | 5/1910 | Donaldson .................... 351/61 |
| 2,276,102 | A | 3/1942 | Schwartz |
| 3,471,222 | A | 10/1969 | Eisler |
| 3,535,028 | A | 10/1970 | Faas |
| 3,549,245 | A | 12/1970 | Bolden |
| 3,773,407 | A | 11/1973 | Stoner |
| 4,196,981 | A | 4/1980 | Waldrop |
| 4,451,127 | A | 5/1984 | Moffitt, Jr. |
| 5,004,334 | A | 4/1991 | Miele |
| 5,118,178 | A | 6/1992 | Tuckman |
| 6,174,059 | B1 | 1/2001 | Haley |
| 6,761,450 | B1 | 7/2004 | Baum et al. |
| 6,905,207 | B2 | 6/2005 | Sordjan, Jr. |
| 7,182,460 | B2 | 2/2007 | Pierotti |
| 7,192,133 | B1 | 3/2007 | Yang |
| D574,035 | S | 7/2008 | Cunningham et al. |
| 2002/0093622 | A1 | 7/2002 | Tostado |
| 2006/0285073 | A1 | 12/2006 | Yeh |

* cited by examiner

*Primary Examiner*—Hung X Dang
(74) *Attorney, Agent, or Firm*—Charles J. Prescott

(57) ABSTRACT

A pair of eyeglasses including right and left lenses, each having a top edge having a downwardly extending notch formed into a central portion of each said top edge, the notches preferably being sized to receive a tubular shape of an eyepiece of a microscope or other such optical device. A frame includes lens support structure to be worn over the bridge of the wearer's nose and carries the lenses so that, when the frame is worn in a normal wearing position, the lenses are in optical registry with the corresponding eye of the wearer and define a substantial lower vertical corrected field of vision for viewing objects close up through the lenses and a substantial upper vertical uncorrected field of vision extending upwardly from the top edges of said lenses for viewing distant objects by looking above the top edge of the lenses without repositioning the eyeglasses to utilize said upper and lower vertical fields of vision. The notches are in horizontal alignment with the wearer's cornea whereby the wearer may position the eyepieces within the notches to enable an uncorrected viewing through the microscope when the eyeglasses are being worn in the normal wearing position.

3 Claims, 6 Drawing Sheets

EYEGLASSES

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to eyeglasses, and more particularly to a pair of eyeglasses which permit somewhat downward, straightforward, and upper gaze unobstructed view while affording lens correction when looking more fully downwardly and which will facilitate unobstructed vision through an optical device such as a microscope or binoculars.

2. Description of Related Art

Those eyeglass wearers whose eyes are considered to be "farsighted", i.e., able to see at a farther distance without the need for lens correction, but still require some corrective vision when viewing objects at a closer distance, are able to accommodate such eye irregularities with what are known as "half glasses" or reading glasses. One early disclosure of such eyeglasses is shown in U.S. Pat. No. 3,535,028 invented by Faas.

Other eyeglasses utilizing half or partial lenses are also taught in prior art. U.S. Pat. No. 3,471,222 to Eisler discloses eyeglasses having lenses resiliently secured in a grooved half frame.

Eyeglasses for a nearsighted person are disclosed in U.S. Pat. No. 3,773,407 to Stoner. U.S. Pat. No. 3,549,245 to Bolden discloses eyeglasses designed for use by surgeons having semi-elliptical lenses mounted in a frame at a level so as not to obstruct the vision of the surgeon when using a microscope.

Haley teaches eyeglasses particularly intended to be worn by individuals having myopia who do not need correction to view nearby objects, as well as a method of using the eyeglasses by individuals having myopia and presbyopia to enable them to see objects both close up and at a distance without repositioning the frame in U.S. Pat. No. 6,174,059.

In U.S. Pat. No. 6,905,207, Haley teaches anti-glare eyeglasses which divide the wearer's field of vision into an upper and lower field of vision, so that the upper field is corrected or tinted in some manner and the lower field of vision is unaltered.

However, regardless of the type of prior art eyeglasses described above being worn by a user, should the circumstance arise for observing an object through an optical device such as a microscope or binoculars, the eyeglasses must be removed completely from the user's face or moved to atop the head to be out of the way of the eyepieces of such optical instruments and devices.

The present invention provides a unique form of eyeglasses for wearers who are farsighted and who routinely have a need for observing objects through an optical instrument such as that of a microscope or binoculars. This invention is generally in the form of eyeglasses utilizing lower-half lenses with a distinctive modification of an arcuate notch formed downwardly into the upper or top edge of each of the lenses. The size and configuration of each of the notches is preferably semi-circular and sized to receive the lower half of a tubular barrel of an eyepiece of an optical instrument such as a microscope or binoculars. By this arrangement, a user of the present invention may continually wear the eyeglasses in the normal position for viewing objects close-up and still have ready access to viewing objects through an optical device such as a microscope or binoculars at will.

The foregoing examples of the related art and limitations related therewith are intended to be illustrative and not exclusive. Other limitations of the related art will become apparent to those skilled in the art upon a reading of the specification and a study of the drawings.

BRIEF SUMMARY OF THE INVENTION

This invention is directed to a pair of eyeglasses including right and left lenses, each having a top edge having a downwardly extending notch formed into a central portion of each said top edge, the notches preferably being sized to receive a tubular shape of an eyepiece of a microscope or other such optical device. A frame includes lens support structure to be worn over the bridge of the wearer's nose and carries the lenses so that, when the frame is worn in a normal wearing position, the lenses are in optical registry with the corresponding eye of the wearer and define a substantial lower vertical corrected field of vision for viewing objects close up through the lenses and a substantial upper vertical uncorrected field of vision extending upwardly from the top edges of said lenses for viewing distant objects by looking above the top edge of the lenses without repositioning the eyeglasses to utilize said upper and lower vertical fields of vision. The notches are in horizontal alignment with the wearer's cornea whereby the wearer may position the eyepieces within the notches to enable an uncorrected viewing through the microscope when the eyeglasses are being worn in the normal wearing position.

It is therefore an object of this invention to provide a pair of eyeglasses which may conveniently be worn by wearers requiring optical correction at close distances only and which facilitate the ready and frequent use of an optical instrument such as microscope without removal of the eyeglasses from the normal wearing position.

Still another object of this invention is to provide a pair of eyeglasses for wearers with optical farsightedness who are able to look straight forwardly and upwardly and somewhat downwardly through an uncorrected field of vision and still be provided with a corrected field of vision when looking further downwardly at close objects.

The following embodiments and aspects thereof are described and illustrated in conjunction with systems, tools and methods which are meant to be exemplary and illustrative and not limiting in scope. In various embodiments one or more of the above-described problems have been reduced or eliminated while other embodiments are directed to other improvements. In addition to the exemplary aspects and embodiments described above, further aspects and embodiments will become apparent by reference to the drawings and by study of the following descriptions.

BRIEF DESCRIPTION OF THE SEVERAL VIEWS OF THE DRAWING(S)

Exemplary embodiments are illustrated in reference figures of the drawings. It is intended that the embodiments and figures disclosed herein are to be considered to be illustrative rather than limiting.

DETAILED DESCRIPTION OF THE INVENTION

Figure 1:
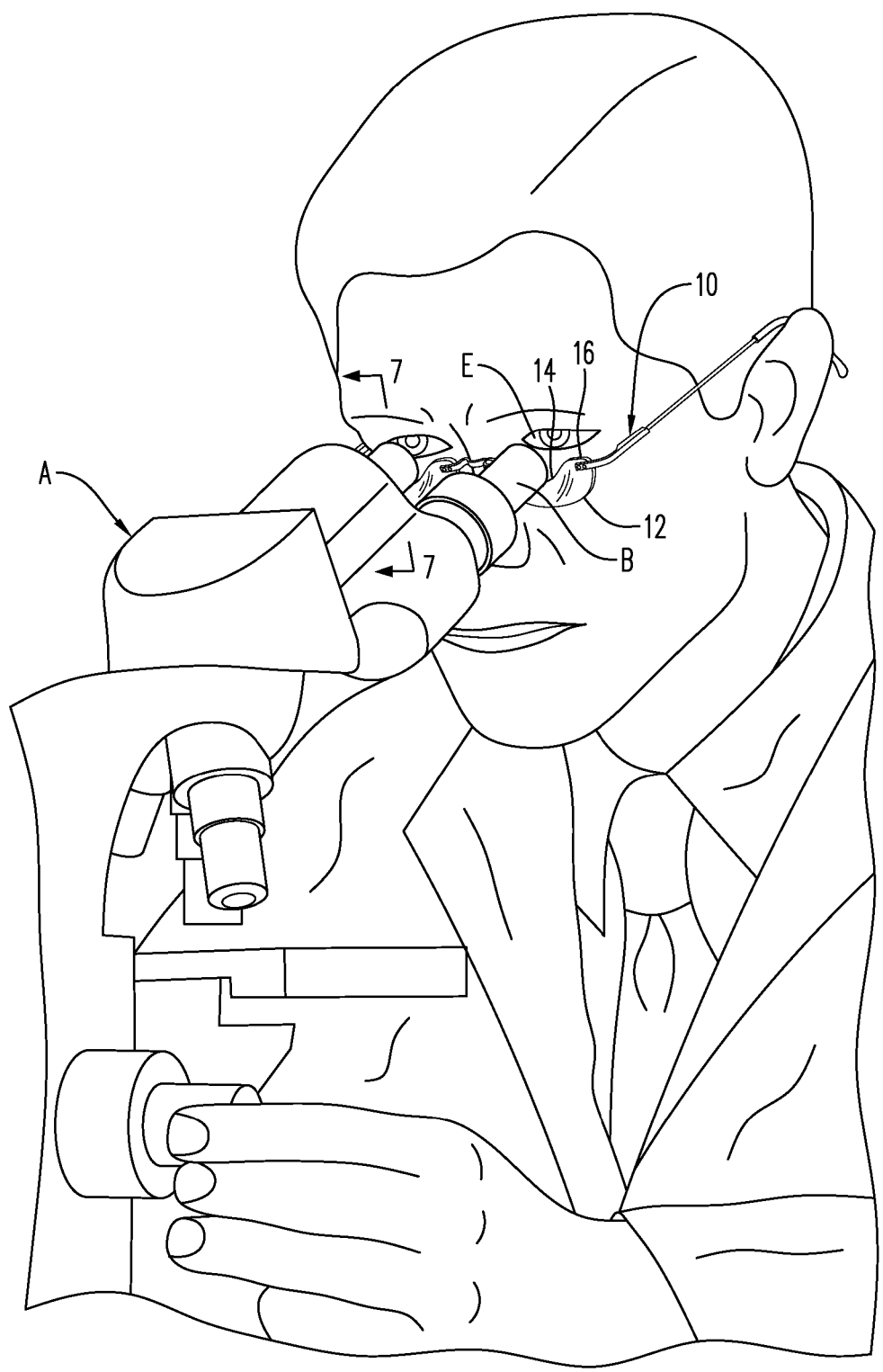
FIG. 1 is a perspective view of the invention in a normal wearing position on a person who is also looking into the eyepieces of a microscope.

Referring now to the drawings, as best seen in FIG. 1, the preferred embodiment of the invention, shown generally at numeral 10, is in the normal wearing position on the nose and across the eyes of a wearer. The nosepiece 24 is resting across the bridge of the nose while the stems 26 and 28 extend backwardly to receive support around the ears of the wearer.

Figure 9:
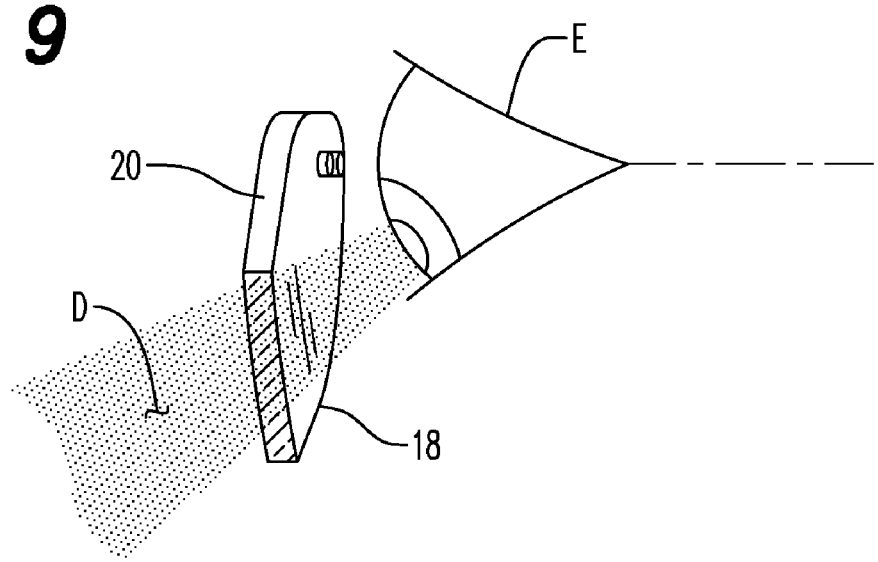
FIG. 9 is a view similar to FIG. 8 showing the eye of the wearer looking downwardly through a corrected field of vision.

The eyeglasses 10 include left and right lenses 12 and 18 which provide optical correction when the line of eyesight is directed therethrough such as at D shown in FIG. 9. The direction of gaze D from the eye E of the wearer passes through the corrective lens 18 so that objects observed will enjoy vision correctiveness by the lens 18 (and 12).

Figure 1A:
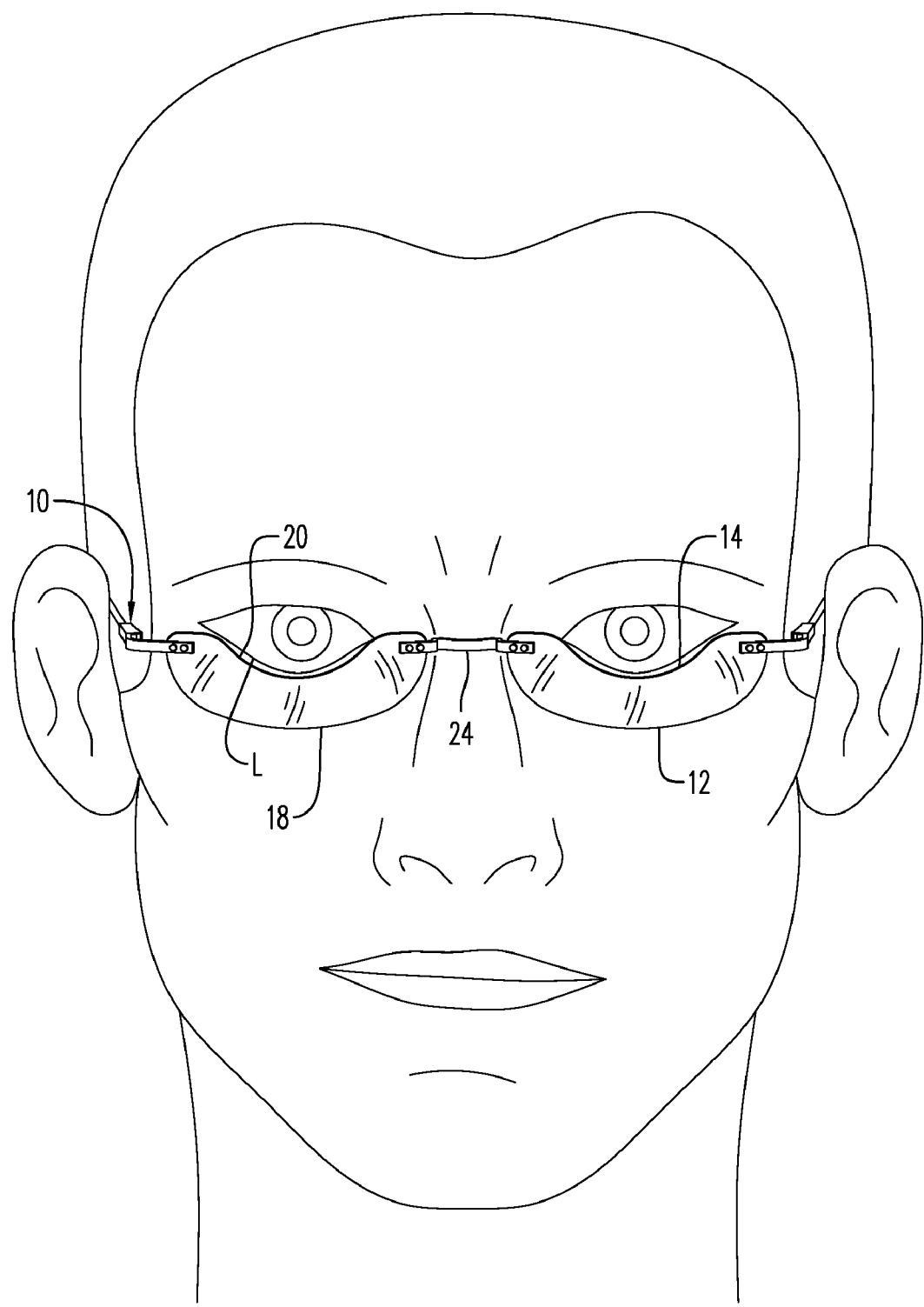
FIG. 1A is a front elevation view of the person wearing the eyeglasses in FIG. 1.
Figure 2:
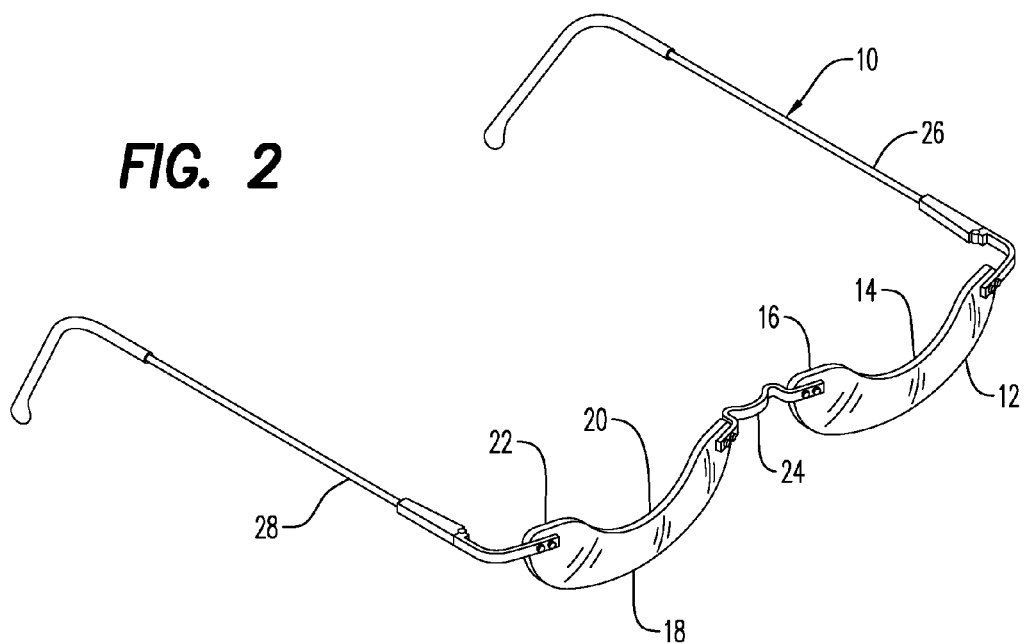
FIGS. 2 and 3 are perspective views of the eyeglasses of FIG. 1.
Figure 3:
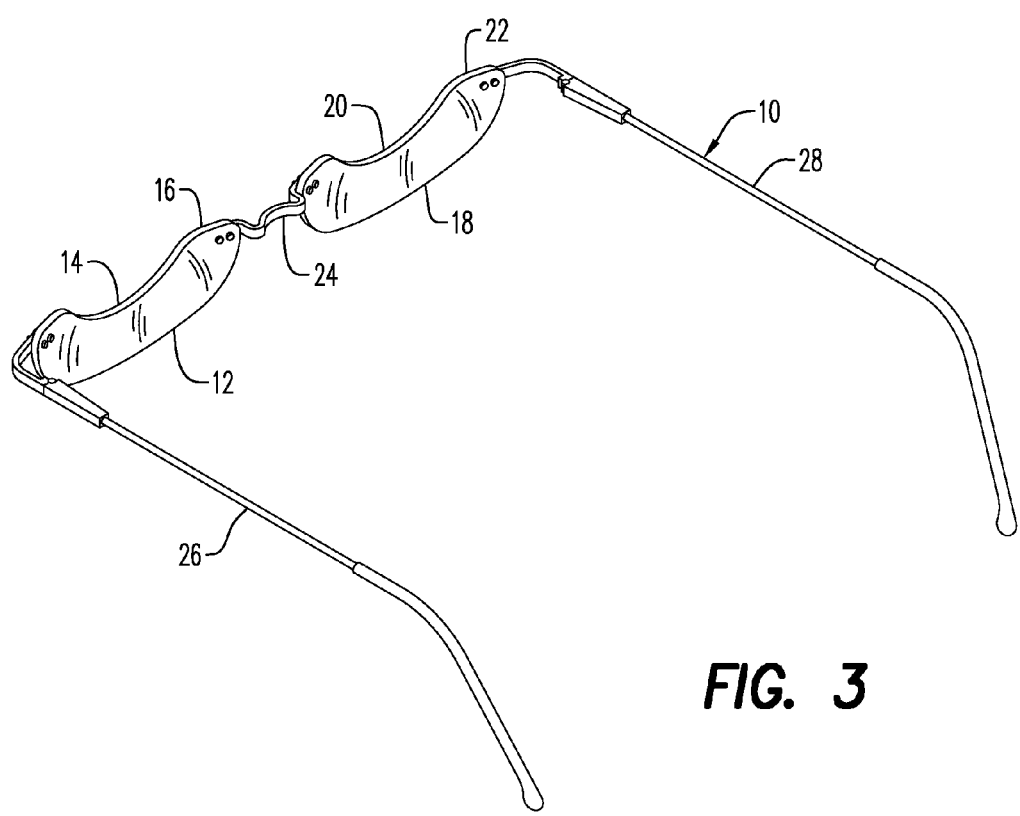
Figure 4:
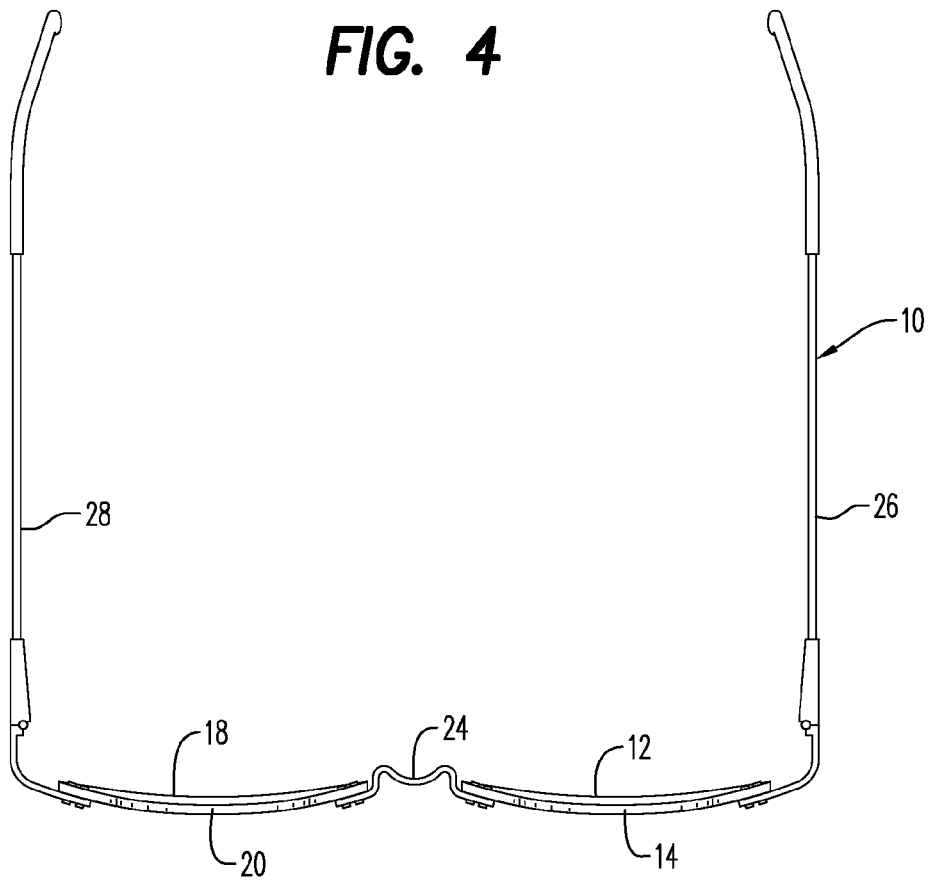
FIG. 4 is a top elevation view of the eyeglasses of FIG. 1.
Figure 5:
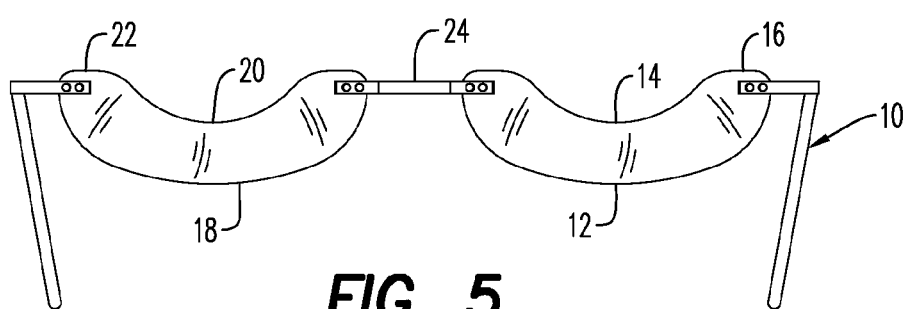
FIG. 5 is a front elevation view of the eyeglasses of FIG. 1.
Figure 6:
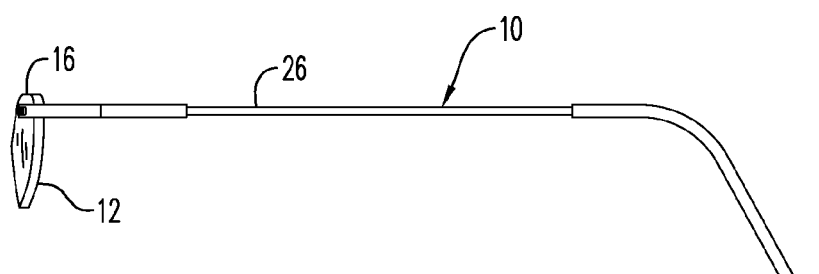
FIG. 6 is a right side elevation view of FIG. 4.
Figure 7:
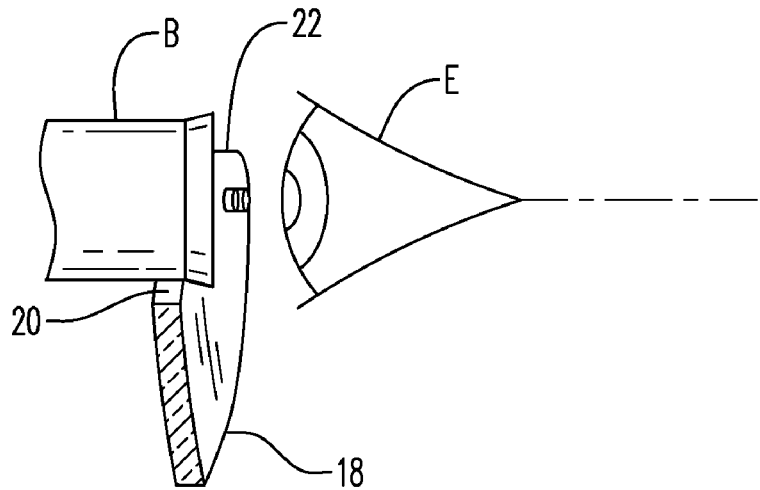
FIG. 7 is a schematic section view in the direction of arrows 7-7 in FIG. 1.

Each of the lenses 12 and 18 include arcuate notches 14 and 20 which are formed into the top edges 16 and 22 of the respective lenses 12 and 18 and extend downwardly toward the central portions thereof. These arcuate notches 14 and 20 are generally sized and shaped so as to be fitted against the tubular eyepieces B of a microscope A such that, while the eyeglasses 10 are in the normally worn position on the face of the wearer, as seen in FIGS. 1A and 7, each of the lenses 12 and 18 may be positioned by head and body placement so that the notches 14 and 20 are in close proximity directly beneath the eyepieces B. By this arrangement, the line of vision of the user from each eye E into the eyepiece B will be unobstructed and straightforwardly of each of the eyes E into the eyepiece B without having to remove the eyeglasses 10 altogether.

Figure 8:
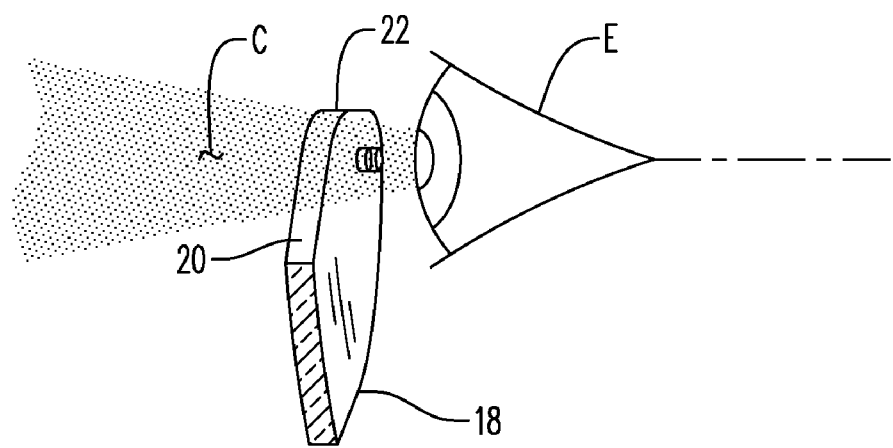
FIG. 8 is a view similar to FIG. 7 absent the microscope eyepiece.

However, when the wearer is not looking into the microscope A, but rather is directing the field of vision directly horizontally outwardly at distant objects such as shown in FIG. 8 wherein the field of vision C is straightforwardly, the wearer enjoys an unobstructed field of vision C through the arcuate notches 14 and 20. When the occasion arises that the wearer needs to look at an object close up and enjoy optical correctiveness, as seen in FIG. 9, the field of vision D will easily pass through each of the lenses 12 and 18 whereupon the optical corrections built into each of the lenses 12 and 18 for close-up viewing is manifested.

Figure 10:
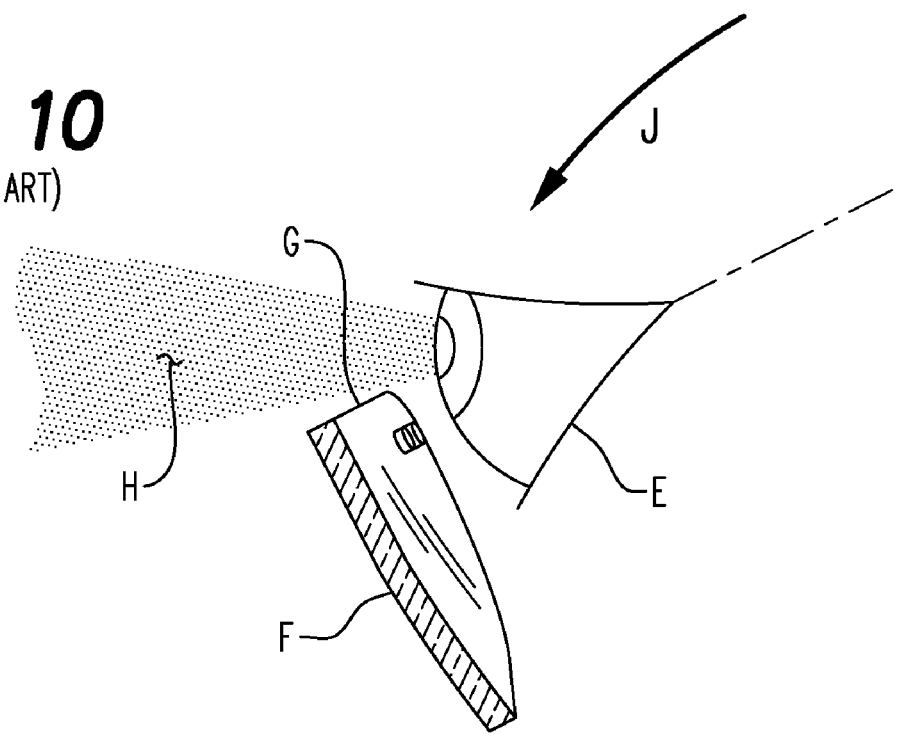
FIG. 10 is a schematic side elevation section view showing the re-orientation of the head and eye of the wearer of a pair of conventional lower half glasses in order to obtain an unobstructed field of vision above the top edge of each of the half lenses.

To demonstrate the further overall usefulness of these arcuate notches 14 and 20 formed into each of the corrective half lenses 12 and 18, a conventional half lens arrangement is shown in FIG. 10 for comparison wherein, to enjoy an unobstructed forwardly field of vision H, the user must tip the head forward in the direction of arrow J with the eye E elevated upwardly in order to be able to see over the top edge G of a conventional half lens F.

As again seen in FIG. 1A, the preferred configuration of each of the notches 14 and 20 as held and established between the stems 26 and 28 and nosepiece 24 is such that the top edges 16 and 22 of the notches 14 and 20, respectively, extend generally in vertical and horizontal alignment and positioning with the lower eyelids L of each of the eyes E. This vertical positioning of the arcuate notches 14 and 20 with respect to the lower eyelids L affords the line of sight benefits previously described in FIGS. 7, 8 and 9 to optimize on the corrective/unobstructive field of vision in all of the circumstances of use of the present invention by a user with the optical limitation known as farsightedness.

While a number of exemplary aspects and embodiments have been discussed above, those of skill in the art will recognize certain modifications, permeations and additions and subcombinations thereof. It is therefore intended that the following appended claims and claims hereinafter introduced are interpreted to include all such modifications, permeations, additions and subcombinations that are within their true spirit and scope.

The invention claimed is:

1. A pair of eyeglasses comprising:
   right and left half lenses, each said lens having a top edge with a concaved, curved or arcuate notch which extends downwardly a distance of about half the width of said lens, said notch being semi-circular in shape and sized to receive a tubular shape of an eyepiece of a microscope;
   a frame including carrying said lenses so that, when said frame is worn in a normal wearing position, said left lens is in optical registry with the wearer's left eye and said right lens is in optical registry with the wearer's right eye to define a substantial lower vertical corrected field of vision for viewing objects close-up through the lenses and a substantial upper vertical uncorrected field of vision extending upwardly from the top edges of said lenses for viewing distant objects by looking above the top edge of the lenses without repositioning the eyeglasses to utilize said upper and lower vertical fields of vision;
   the top edge of each of the lenses being beneath a horizontal line of sight when said eyeglasses are worn by a person in the normal wearing position, the wearer being able to position the eyepieces within the notches to enable an uncorrected viewing through the microscope.

2. A pair of eyeglasses comprising:
   right and left half lenses, each having a top edge with a downwardly extending substantially curved semicircular notch formed into a central portion of said top edge, said notch matably engageable against a tubular eyepiece of a microscope;
   a frame carrying said lenses in optical registry with the wearer's eyes to define a substantial lower vertical corrected field of vision and a substantial upper vertical uncorrected field of vision extending upwardly from the curved notches for viewing distant objects.

3. A pair of eyeglass lenses comprising:

right and left lenses, each having a top edge with a substantially semi-spherically shaped notch extending downwardly from said top edge to a central portion of each said lens, each said notch being sized to receive a tubular shape of an eyepiece of a microscope;

each said lens defining a lower vertical corrected field of vision and a substantial upper vertical uncorrected field of vision extending upwardly from said notch;

said notches being in alignment with the wearer's cornea which enables the eyepieces of the microscope to be positioned within the notches to enable an uncorrected viewing through the microscope.

* * * * *